(12) United States Patent
Feng et al.

(10) Patent No.: US 9,239,474 B2
(45) Date of Patent: Jan. 19, 2016

(54) THERMOCHROMATIC ELEMENT AND THERMOCHROMATIC DISPLAY APPARATUS

(71) Applicant: Beijing FUNATE Innovation Technology Co., LTD., Beijing (CN)

(72) Inventors: Chen Feng, Beijing (CN); Li Qian, Beijing (CN); Yu-Quan Wang, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 371 days.

(21) Appl. No.: 13/874,460

(22) Filed: Apr. 30, 2013

(65) Prior Publication Data

US 2014/0104668 A1   Apr. 17, 2014

(30) Foreign Application Priority Data

Oct. 15, 2012  (CN) .................. 2012 1 0388115

(51) Int. Cl.
*G02F 1/01* (2006.01)
*G02F 1/00* (2006.01)
*B82Y 20/00* (2011.01)

(52) U.S. Cl.
CPC .............. *G02F 1/009* (2013.01); *G02F 1/0147* (2013.01); *B82Y 20/00* (2013.01)

(58) Field of Classification Search
CPC ..................................................... G02F 1/0147
See application file for complete search history.

(56) References Cited

U.S. PATENT DOCUMENTS

| 8,289,611 | B2 | 10/2012 | Liu et al. |
| 8,614,849 | B2 | 12/2013 | Liu et al. |
| 2011/0157672 | A1 | 6/2011 | Liu et al. |
| 2011/0157674 | A1 | 6/2011 | Liu et al. |
| 2011/0317244 | A1* | 12/2011 | Liu et al. ............... 359/288 |

FOREIGN PATENT DOCUMENTS

| CN | 101923227 | 12/2010 |
| CN | 102116942 | 7/2011 |
| CN | 102116943 | 7/2011 |
| TW | 201020208 | 6/2010 |
| TW | 201133108 | 10/2011 |
| TW | 201133425 | 10/2011 |

* cited by examiner

*Primary Examiner* — Joseph P Martinez
(74) *Attorney, Agent, or Firm* — Novak Druce Connolly Bove + Quigg LLP

(57) ABSTRACT

A thermochromatic element includes a color element and at least one heating element configured to supply heat for the color element such that the color element changes color. The at least one heating element includes at least one carbon nanotube film. Each carbon nanotube film includes a number of carbon nanotube linear units and a number of carbon nanotube groups. Each carbon nanotube linear unit includes a number of carbon nanotubes substantially oriented along a first direction, and are spaced from each other and substantially extending along the first direction. The carbon nanotube groups are combined with the carbon nanotube linear units by van der Waals force. The carbon nanotube groups between adjacent carbon nanotube linear units are spaced from each other in the first direction.

20 Claims, 13 Drawing Sheets

THERMOCHROMATIC ELEMENT AND THERMOCHROMATIC DISPLAY APPARATUS

BACKGROUND

1. Technical Field

The present disclosure relates to a thermochromatic element and a thermochromatic display apparatus using the same.

2. Discussion of Related Art

Thermochromatic materials are materials that can change their color in response to changes in temperature. Thermochromatic materials can be used to make a thermochromatic element.

A thermochromatic element, according to the prior art usually includes a support substrate, a thermochromatic material layer located on a surface of the support substrate, and a heater. The heater is used to heat the thermochromatic material layer. The heater is usually made of ceramics, conductive glasses or metals. However, a color change speed of the thermochromatic element is slow because of the relatively high heat capacity per unit and slow heating speed of the heater.

What is needed, therefore, is to provide a thermochromatic element having an improved color change speed and thermochromatic display apparatus using the same.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
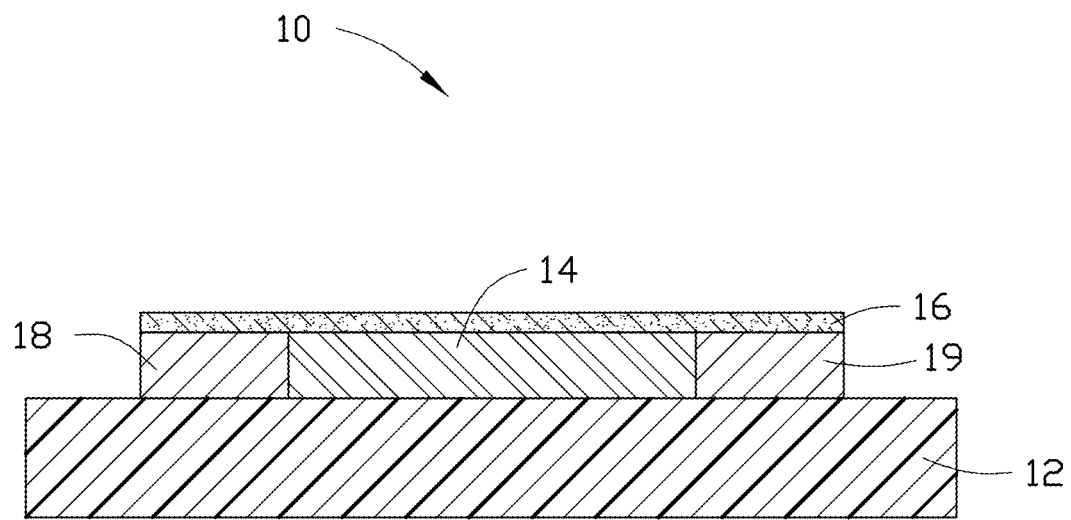
FIG. 1 is a schematic view of one embodiment of a thermochromatic element.

Referring to FIG. 1, a thermochromatic element 10 of one embodiment includes an insulating substrate 12, a color element 14, at least one heating element 16, a first electrode 18, and a second electrode 19.

The insulating substrate 12 has a surface (not labeled). The color element 14 can be located between the insulating substrate 12 and the heating element 16. Alternatively, the color element 14 can be located substantially adjacent to, about, above, on, or under the heating element 16. Any arrangement can be made as long as the heating element 16 can heat the color element 14 to change color. The first electrode 18 is separated from and electrically connected with the second electrode 19. The first electrode 18 and the second electrode 19 are located on two opposite ends of the heating element 16 and electrically connected with the heating element 16 to apply a voltage on the heating element 16, which makes the heating element 16 supply heat for the color element 14.

The color element 14 and the at least one heating element 16 can be sheet-shaped structures, and the color element 14 can be overlapped with the at least one heating element 16. The at least one heating element 16 can directly contact with a surface of the sheet-shaped color element 14. In one embodiment, the color element 14 is located on the surface of the insulating substrate 12, and the at least one heating element 16 is attached to the surface of the color element 14.

The at least one heating element 16 can also indirectly contact and overlap with the surface of the sheet-shaped color element 14. The at least one heating element 16 is substantially parallel to and spaced from the color element 14. In one embodiment, the color element 14 is located between the heating element 16 and the insulating substrate 12, and the at least one heating element 16 is spaced and overlapped with the color element 14 by a support (not shown). In addition, the color element 14 can be a non-layered structure, such as particles or powder, the color element 14 is dispersed in the at least one heating element 16 to form a composite.

The insulating substrate 12 may be made of rigid material or flexible material. The rigid material may be ceramic, glass, quartz, resin, silicon, silicon dioxide, diamond, or alumina. The flexible material may be flexible polymer, fiber, or synthetic paper. The flexible polymer can be polyethylene terephthalate (PET), polycarbonate (PC), polyethylene (PE), or polyimide (PI). When the insulating substrate 12 is made of flexible material, the thermochromatic element 10 can be folded into random shapes during use. The melting point of the insulating substrate 12 is equal to or higher than 200° C. A size and a thickness of the insulating substrate 12 can be chosen according to need. In one embodiment, the insulating substrate 12 is a PET film with a thickness of about 1 millimeter.

The color element 14 is made of color-changeable material capable of performing a color transformation at a temperature. The color-changeable material can be irreversible, single directional color-changeable material or a reversible color-changeable material including one or more of a structural transformation color-changeable material, a hydrating and dehydrating color-changeable material, a ligancy transformation color-changeable material, and a liquid crystal microcapsule color-changeable material. The color-changeable material can perform a color transformation between the crystalline and amorphous at a temperature phase change to change the color. In one embodiment, the color-changeable material, having a temperature phase change above 40° C. allows the thermochromatic element 10 to work at room temperature. The color-changeable material having a temperature phase change below 600° C. allows the thermochromatic element 10 have a low working voltage, and the power consumption decreases. In addition, the color-changeable material having a temperature phase change below 600° C. allows the heating element 16 based on the carbon nanotubes to not be oxidated and to have a long lifespan.

Because the reflectivity of the crystalline color-changeable material and the amorphous color-changeable material of the color element 14 is different, the color element 14 can show different brightness and the thermochromatic element 10 can display an image. In one embodiment, the brightness can be discriminated by the eye so that the thermochromatic element 10 can be used to display a visual image. The phase change time for the color-changeable material to perform a transformation between the crystalline and amorphous can be as short as possible so that the thermochromatic element 10 has a fast response speed. In one embodiment, the phase change time is shorter than 40 milliseconds. The color-changeable material can be chalcogenide compound such as sulfur-based compound, tellurium-based compound, selenium-based compound, or tellurium-selenium-based compound.

In one embodiment, the color element 14 is a layer of germanium-selenium compound with a thickness from about 10 micrometers to about 500 micrometers. In other embodiments, the color element 14 is a layer of germanium-selenium compound with a thickness from about 50 micrometers to about 100 micrometers. The color element 14 can be formed by sputtering or thermal deposition. The color element 14 is located between the first electrode 18 and the second electrode 19. The color element 14 can be spaced from the first electrode 18 and the second electrode 19 or make contact with the first electrode 18 and the second electrode 19.

The heating element 16 can be a carbon nanotube structure including a number of carbon nanotubes. In one embodiment, the carbon nanotube structure consists of the carbon nanotubes. The carbon nanotube structure is a free standing structure. "Free-standing structure" means that the carbon nanotube film does not have to be supported by a substrate and can sustain the weight of itself when it is hoisted by a portion thereof without tearing. The carbon nanotube structure includes at least one carbon nanotube film. The structure of the carbon nanotube film can be shown in FIGS. 2-5. In one embodiment, a heat capacity per unit area of the heating element 16 is less than $2 \times 10^{-4}$ J/m$^2$·K. In another embodiment, the heating element 16 is a single layer of a carbon nanotube film 160 with the heat capacity per unit area less than $1.7 \times 10^{-6}$ J/m$^2$·K.

Figure 2:
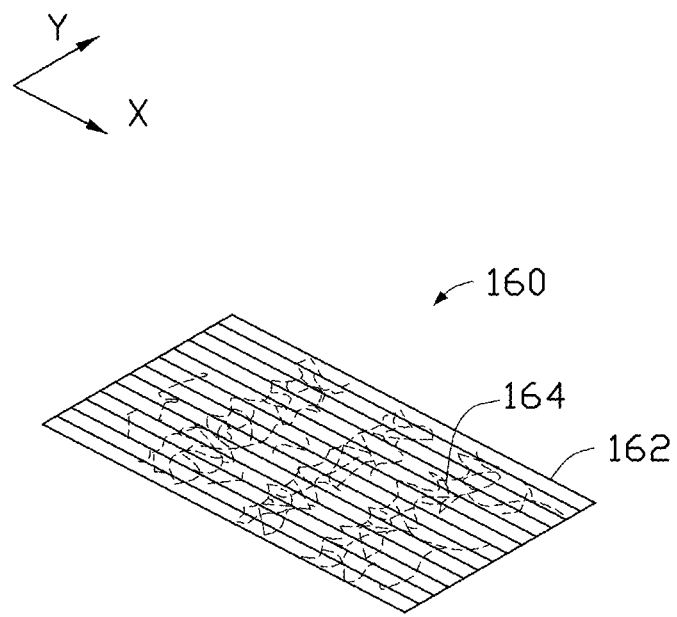
FIG. 2 is a schematic view of one embodiment of a carbon nanotube film including a number of carbon nanotube groups arranged as an array.
Figure 3:
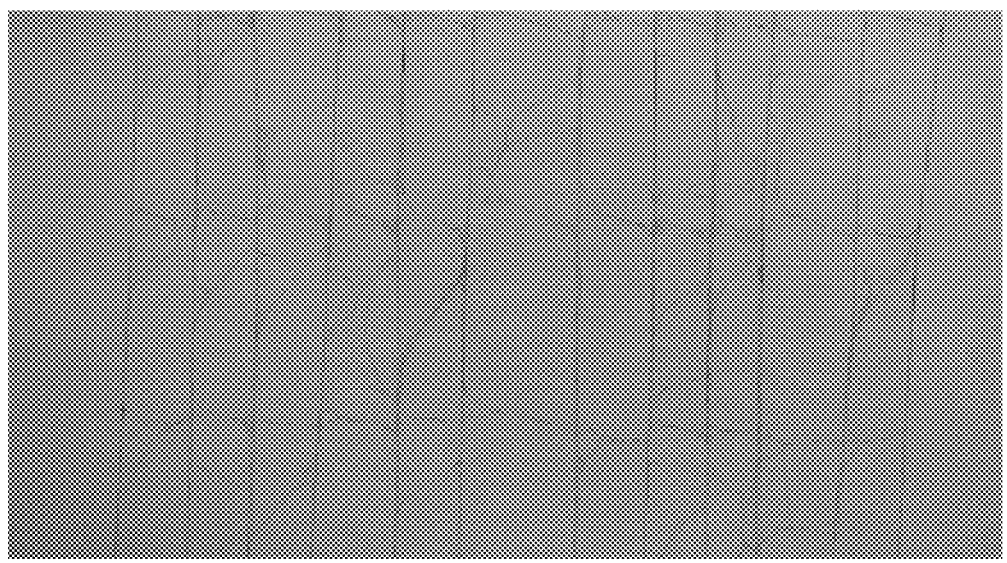
FIG. 3 is an optical microscope image of the carbon nanotube film shown in FIG. 2.

Referring to FIG. 2 and FIG. 3, the carbon nanotube film 160 includes a number of carbon nanotube linear units 162 and a number of carbon nanotube groups 164. The carbon nanotube linear units 162 are spaced from each other. The carbon nanotube groups 164 join with the carbon nanotube linear units 162 by van der Waals force. The carbon nanotube groups 164 located between adjacent carbon nanotube linear units 162 are separated from each other.

Each carbon nanotube linear unit 162 includes a number of first carbon nanotubes extending substantially along a first direction X. Adjacent first carbon nanotubes extending substantially along the first direction X are joined end to end by van der Waals attractive force. In one embodiment, an axis of each carbon nanotube linear unit 162 is substantially parallel to the axes of first carbon nanotubes in each carbon nanotube linear unit 162. The carbon nanotube linear units 162 extend substantially along the first direction X, and are separated from each other in a second direction Y intercrossed with the first direction X.

An intersection shape of each carbon nanotube linear unit 162 can be a semi-circle, circle, ellipse, oblate spheriod, or other shapes. In one embodiment, the carbon nanotube linear units 162 are substantially parallel to each other. Distances between adjacent carbon nanotube linear units 162 are substantially equal. The carbon nanotube linear units 162 are substantially coplanar. An effective diameter of each carbon nanotube linear unit 162 is larger than or equal to 0.1 micrometers, and less than or equal to 100 micrometers. In one embodiment, the effective diameter of each carbon nanotube linear unit 162 is larger than or equal to 5 micrometers, and less than or equal to 50 micrometers. A distance between adjacent two carbon nanotube linear units 162 is not limited and can be selected as desired. In one embodiment, the distance between adjacent two carbon nanotube linear units 162 is greater than 0.1 millimeters. Diameters of the carbon nanotube linear units 162 can be selected as desired. In one embodiment, the diameters of the carbon nanotube linear units 162 are substantially equal.

The carbon nanotube groups 164 are separated from each other and combined with adjacent carbon nanotube linear units 162 by van der Waals force in the second direction Y, so that the carbon nanotube film 160 is a free-standing structure. The carbon nanotube groups 164 are alternated with the carbon nanotube linear units 162 on the second direction Y. In one embodiment, the carbon nanotube groups 164 arranged in the second direction Y are separated from each other by the carbon nanotube linear units 162. The carbon nanotube groups 164 arranged in the second direction Y can connect with the carbon nanotube linear units 162.

The carbon nanotube group 164 includes a number of second carbon nanotubes joined by van der Waals force. Axes of the second carbon nanotubes can be substantially parallel to the first direction X or the carbon nanotube linear units 162. The axes of the second carbon nanotubes can also be intercrossed with the first direction X or the carbon nanotube linear units 162 such that the second carbon nanotubes in each carbon nanotube group 164 are intercrossed into a network structure.

The axes of second carbon nanotubes and the first direction X define first angles. Each first angle can be greater than or equal to 0 degrees, and less than or equal to 90 degrees. In one embodiment, the first angle is greater than or equal to 45 degrees, and less than or equal to 90 degrees. In another embodiment, the first angle is greater than or equal to 60 degrees, and less than or equal to 90 degrees.

Figure 4:
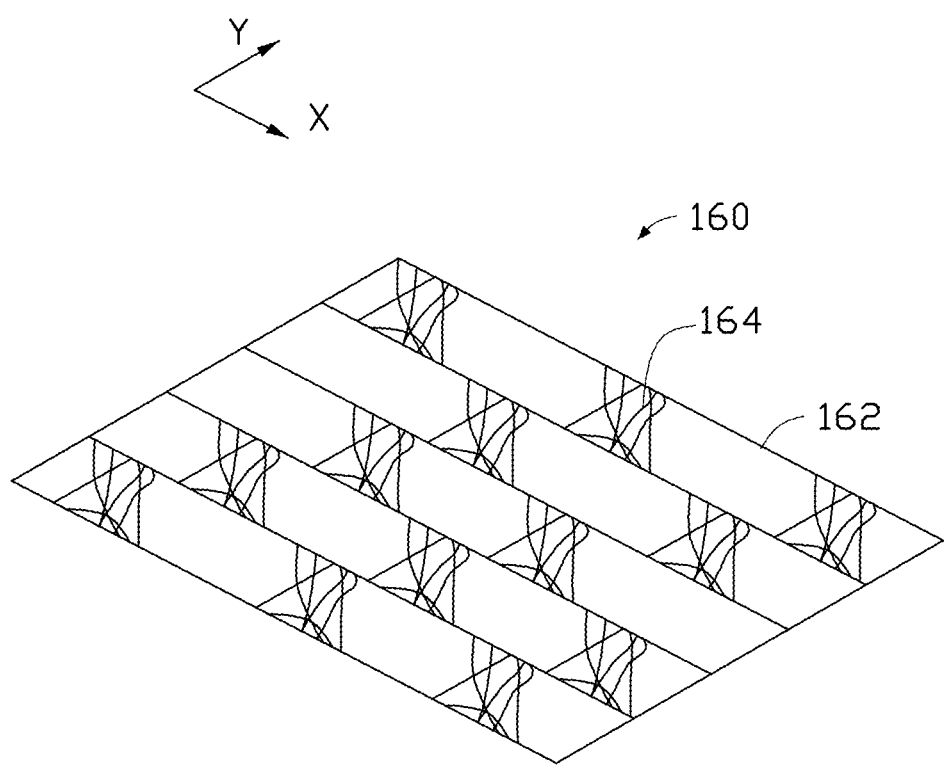
FIG. 4 is a schematic view of one embodiment of a carbon nanotube film including a number of carbon nanotube groups interlacedly arranged.

In one embodiment, referring to FIG. 4, the carbon nanotube groups 164 can be interlacedly located in the second direction Y and disorderly arranged in the second direction Y. As such, the carbon nanotube groups 164 in the second direction Y form non-linear conductive paths. In one embodiment, referring to FIG. 3, the carbon nanotube groups 164 are arranged into a number of columns in the second direction Y, thus the carbon nanotube groups 164 form consecutive and linear conductive paths in the second direction. In one embodiment, the carbon nanotube groups 164 in the carbon nanotube film are arranged in an array. A length of each carbon nanotube group 164 in the second direction Y is substantially equal to the distance between adjacent carbon nanotube linear units 162. The length of each carbon nanotube group 164 in the second direction Y is greater than 0.1 millimeters. The carbon nanotube groups 164 are also spaced from each other along the first direction X. Spaces between adjacent carbon nanotube groups 164 in the first direction X are greater than or equal to 1 millimeter.

Therefore, the carbon nanotube film includes a number of carbon nanotubes. The carbon nanotubes can be formed into carbon nanotube linear units 162 and carbon nanotube groups 164. In one embodiment, the carbon nanotube film consists of the carbon nanotubes. The carbon nanotube film defines a number of apertures. Specifically, the apertures are mainly defined by the separate carbon nanotube linear units 162 and the spaced carbon nanotube groups 164. The arrangement of the apertures is similar to the arrangement of the carbon nanotube groups 164. In the carbon nanotube film, if the carbon nanotube linear units 162 and the carbon nanotube groups 164 are orderly arranged, the apertures are also orderly arranged. In one embodiment, the carbon nanotube linear units 162 and the carbon nanotube groups 164 are substantially arranged in an array, the apertures are also arranged in an array.

A ratio between a sum area of the carbon nanotube linear units 162 and the carbon nanotube groups 164 and an area of the apertures is less than or equal to 1:19. In other words, in the carbon nanotube film 160, a ratio of the area of the carbon nanotubes to the area of the apertures is less than or equal to 1:19. In one embodiment, in the carbon nanotube film 160, the ratio of the sum area of the carbon nanotube linear units 162 and the carbon nanotube groups 164 to the area of the apertures is less than or equal to 1:49. Therefore, a transparence of the carbon nanotube film 160 is greater than or equal to 95%. In one embodiment, the transparence of the carbon nanotube film 160 is greater than or equal to 98%.

The carbon nanotube film 160 is an anisotropic conductive film. The carbon nanotube linear units 162 form first conductive paths along the first direction, as the carbon nanotube linear units 162 extend along the first direction X. The carbon nanotube groups 164 combined with the carbon nanotube linear units on the second direction form second conductive paths along the second direction Y. The second conductive paths can be curved, as the carbon nanotube groups are interlacedly arranged. The second conductive paths can be linear, as the carbon nanotube groups are arranged as a number of columns and rows. Therefore, a resistance of the carbon nanotube film 160 in the first direction X is different from a resistance of the carbon nanotube film 160 in the second direction Y. The resistance of the carbon nanotube film 160 in the second direction Y is 10 times greater than the resistance of the carbon nanotube film 160 in the first direction X. In one embodiment, the resistance of the carbon nanotube film 160 in the second direction Y is 20 times greater than the resistance of the carbon nanotube film 160 in the first direction X. In one embodiment, the resistance of the carbon nanotube film 160 in the second direction Y is about 50 times greater than the resistance of the carbon nanotube film 160 in the first direction X. In the carbon nanotube film 160, the carbon nanotube linear units 162 are joined by the carbon nanotube groups 164 in the second direction Y, which makes the carbon nanotube film 160 strong and stable, and not broken easily.

There can be a few carbon nanotubes surrounding the carbon nanotube linear units and the carbon nanotube groups in the carbon nanotube film. However, these few carbon nanotubes have a small and negligible effect on the carbon nanotube film properties.

The carbon nanotube film 160 can be made by the following steps: providing an original carbon nanotube film including a number of carbon nanotubes substantially extending along a first direction and joined end to end by van der Waal force; forming a patterned carbon nanotube film by patterning the original carbon nanotube film to define at least one row of through holes arranged in the original carbon nanotube film along the first direction, each row of the through holes including at least two spaced though holes; and treating the patterned carbon nanotube film with a solvent such that the patterned carbon nanotube film is shrunk into the carbon nanotube film. The solvent can be an organic solvent with a high volatility, such as alcohol, methanol, acetone, dichloroethane, or chloroform.

Figure 5:
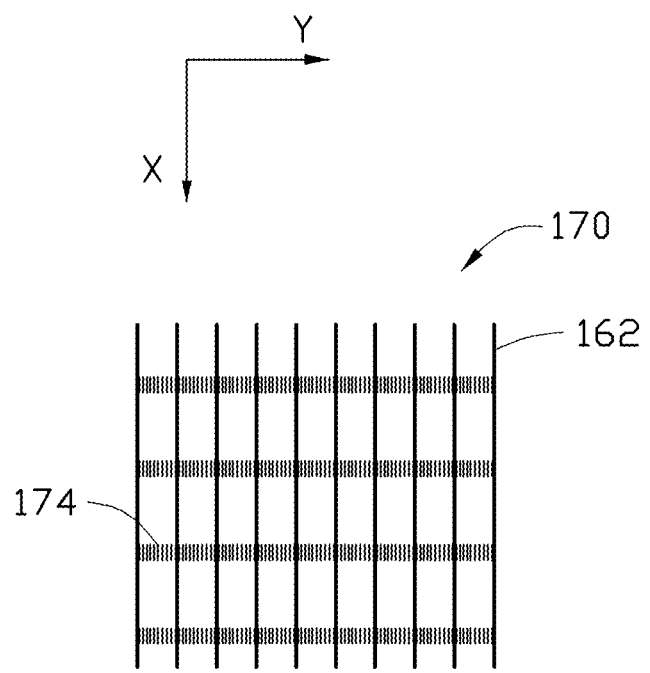
FIG. 5 is a schematic view of one embodiment of a carbon nanotube film including a number of carbon nanotubes substantially oriented along a same direction.
Figure 6:
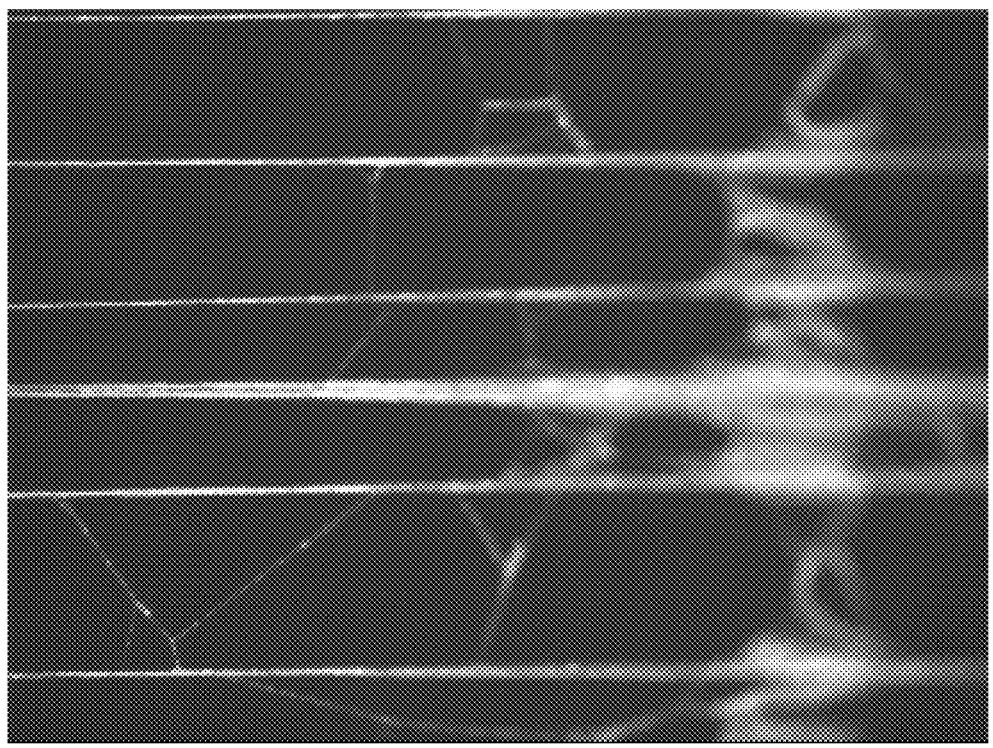
FIG. 6 is an optical microscope image of the carbon nanotube film shown in FIG. 5.

Referring FIG. 5 and FIG. 6, the carbon nanotube film 170 includes a number of carbon nanotubes. The carbon nanotube film 170 includes the carbon nanotube linear units 162 and a number of second carbon nanotube groups 174. Each carbon nanotube group 174 includes a number of second carbon nanotubes extending along a direction which defines a second angle with the first direction X. The second angle can be greater than or equal to 0 degrees and less than or equal to 45 degrees. In one embodiment, the second angle is greater than or equal to 0 degrees and less than or equal to 30 degrees. In another embodiment, the carbon nanotubes in each carbon nanotube group 174 are substantially parallel to the first direction X and axis of the carbon nanotube linear units 162. As such, the carbon nanotubes of the carbon nanotube film 170 substantially extend along a same direction.

In addition, in the carbon nanotube film 170, there are still a few carbon nanotubes surrounding the carbon nanotube linear units 162 and the carbon nanotube groups 174, owing to the limitation of a method for making the carbon nanotube structure.

The method for making the carbon nanotube film 170 is similar to the method for making the carbon nanotube film 160. The difference is that the solvent used for treating the patterned carbon nanotube film has a weak interfacial tension. The solvent can be water, or a mixture of water and the organic solvent.

The heating element 16 can be fixed on the surface of the color element 14 by an adhesive (not shown). The heating element 16 can be directly fixed on the first electrode 18 and the second electrode 19. The heating element 16 can also be fixed on the first electrode 18 and the second electrode 19 by a conductive adhesive. In one embodiment, the conductive adhesive is a silver adhesive.

The heating element 16 mainly includes the carbon nanotubes having a high thermoelectric conversion efficiency and thermo-radiant efficiency. The carbon nanotubes are still chemical stable and mechanical stable, even the carbon nanotubes are in a moist condition. As such the heating element 16 is also kept a high thermoelectric conversion efficiency, a thermo-radiant efficiency, a chemical stableness and a mechanical stableness, even if the heating element 16 is in a moist condition. Therefore, the carbon nanotube structure as the heating element can improve electrothermal efficiency, energy efficiency and life span of the color element. As the heat capacity of the carbon nanotube structure is low, the heating element 16 has a high response heating speed, and the color element 14 can be heated quickly, which makes the thermochromatic element 10 have a high response heating speed and a high sensitivity. The carbon nanotubes have small sizes, and the size of the thermochromatic element 10 using the carbon nanotube structure as the heating element 16 can be reduced. As such, a resolution of a display device using the thermochromatic element 10 can be improved. The transparence of the carbon nanotube film is greater than or equal to 95%, even greater than 98%, the heating element 16 using the carbon nanotube film is transparent, so a definition of the thermochromatic element 10 is high. Therefore, a definition of the display device using the thermochromatic element 10 is high.

The first electrode 18 and the second electrode 19 can be located on the surface of the insulating substrate 12, on the surface of the color element 14, on the surface of the heating element 16, or a supporter (not shown). The first electrode 18 and the second electrode 19 can be made of conductive material such as carbon nanotube, metal, alloy, indium tin oxides (ITO), antimony doped Tin oxide (ATO), conductive polymer, or a conductive slurry. In one embodiment, the first electrode 18 and the second electrode 19 are formed on the surface of the heating element 16 by a printing process. The conductive slurry is composed of metal powder, glass powder, and binder. The metal powder can be silver powder, the glass powder has low melting point, and the binder can be terpineol or ethyl cellulose (EC). The conductive slurry can include from about 50% to about 90% (by weight) of the metal powder, from about 2% to about 10% (by weight) of the glass powder, and from about 8% to about 40% (by weight) of the binder.

During operation of the thermochromatic element 10, a pulse voltage is supplied to the first electrode 18 and the second electrode 19. The temperature of the heating element 16 raises and a heat pulse is supplied to the color element 14 from the heating element 16. When the pulse voltage is short and high, a short and intensive heat write pulse can be supplied by the heating element 16. When the pulse voltage is long and low, a long and weak heat erase pulse can be supplied by the heating element 16. When the thermochromatic element 10 needs to display an image, a short and intensive heat write pulse can be supplied to the color element 14. For example, the temperature of the heat write pulse is in a range from about 900° C. to about 1000° C. and the cycle of the heat write pulse is in a range from about 50 nanoseconds to about 200 nanoseconds. Because the heating temperature of the heat write pulse is very high, the color element 14 is heated to a liquid state instantly. Because the heating time of the heat write pulse is very short, the temperature of the color element 14 decreases instantly and the liquid state color element 14 becomes an amorphous solid state. Because the reflectivity of the amorphous color-changeable material is different from the original crystalline color-changeable material, the color element 14 can show different brightness and the thermochromatic element 10 can display an image. The color-changeable material can keep in amorphous state, at room temperature, without any outside energy. When the thermochromatic element 10 needs to erase the image, a long and weak heat erase pulse can be supplied to heat the color element 14. For example, the temperature of the heat write pulse is in a range from about 500° C. to about 600° C. and the cycle of the heat write pulse is in a range from about 1 microsecond to about 1 millisecond. The process is an annealing process. After annealing the color-changeable material, it changes to the original crystalline state from the amorphous state, and the image is erased. The color-changeable material can keep in crystalline state, at room temperature, without any outside energy. Because of this, the image displayed by the thermochromatic element 10 can remain, where a bistable display can be performed. The bistable display means that the energy is only consumed during the process of writing and erasing, and there is no energy consumption after the process of writing and erasing. Thus, the thermochromatic element 10 can save energy.

Figure 7:
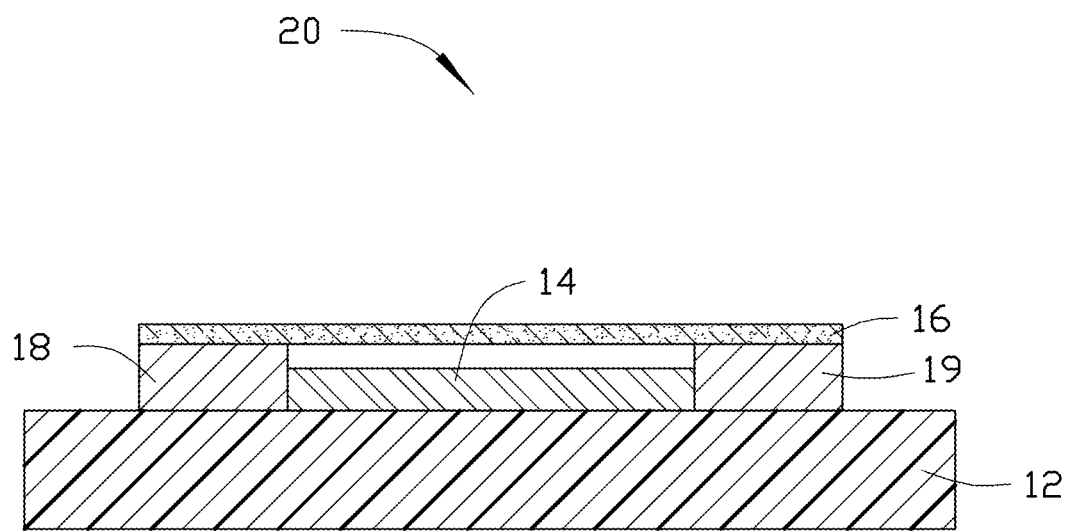
FIG. 7 is a schematic view of one embodiment of a thermochromatic element.

Referring to FIG. 7, a thermochromatic element 20 of one embodiment includes an insulating substrate 12, a color element 14, a heating element 16, a first electrode 18, and a second electrode 19. The thermochromatic element 20 is similar to the thermochromatic element 10 described above except that the heating element 16 is spaced from the color element 14. In one embodiment, both the heating element 16 and the color element 14 are layered structures. The first electrode 18 and the second electrode 19 are located on a surface of the insulating substrate 12 and spaced from each other. The color element 14 is located on the surface of the insulating substrate 12 and between the first electrode 18 and the second electrode 19. The color element 14 is thinner than the first and second electrodes 18, 19. The heating element 16 is located on a surface of the first electrode 18 and the second electrode 19, and spaced from the color element 14. In another embodiment, the heating element 16 is spaced from the color element 14 through two supporters (not shown). As the heating element 16 and the color element 14 are separated from each other, the main heat exchange manner between the color element 14 and the heating element 16 is heat radiation. The heating element 16 has small heat capacity per unit area, the heating element 16 can be heated to a high temperature in short time and supply a short and intensive heat write pulse to the color element 14. Therefore, the thermochromatic element 20 has an improved response speed.

Figure 8:
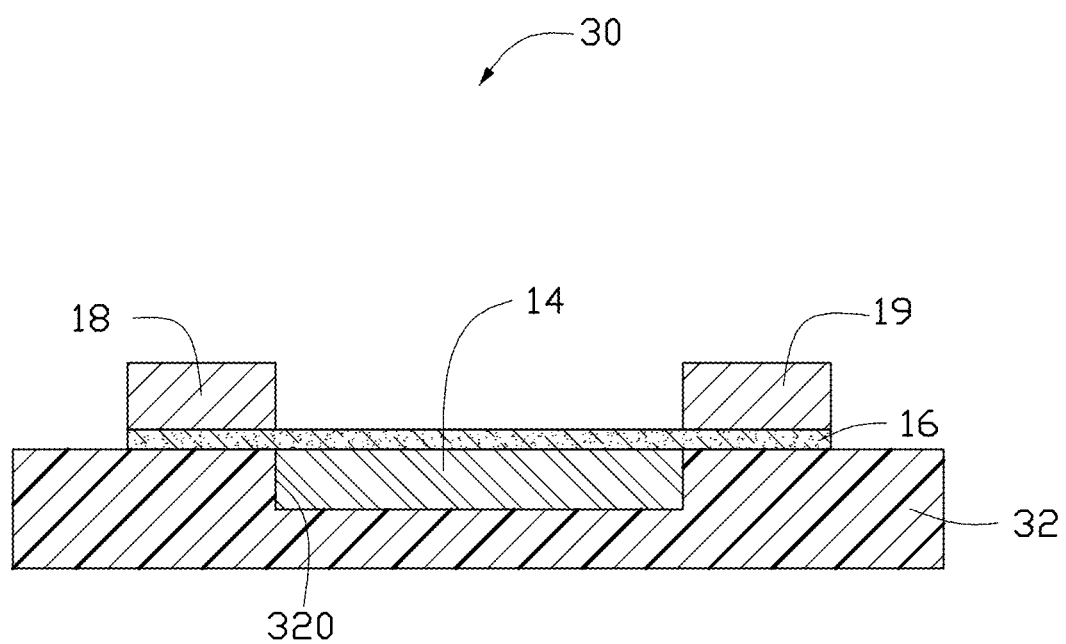
FIG. 8 is a schematic view of one embodiment of a thermochromatic element.

Referring to FIG. 8, a thermochromatic element 30 of one embodiment includes an insulating substrate 32, a color element 14, a heating element 16, a first electrode 18, and a second electrode 19. A recess 320 is defined on a surface of the insulating substrate 32, and the color element 14 is located in the recess 320. In one embodiment, the color element 14 is located in and fills the recess 320. The heating element 16 is located on a surface of the insulating substrate 32 and covers the recess 320. The first electrode 18 and the second electrode 19 are located on a surface of the heating element 16 and spaced from each other. The color element 14 can remain in a shape substantially the same as the shape of the recess 320 during heating process.

Figure 9:
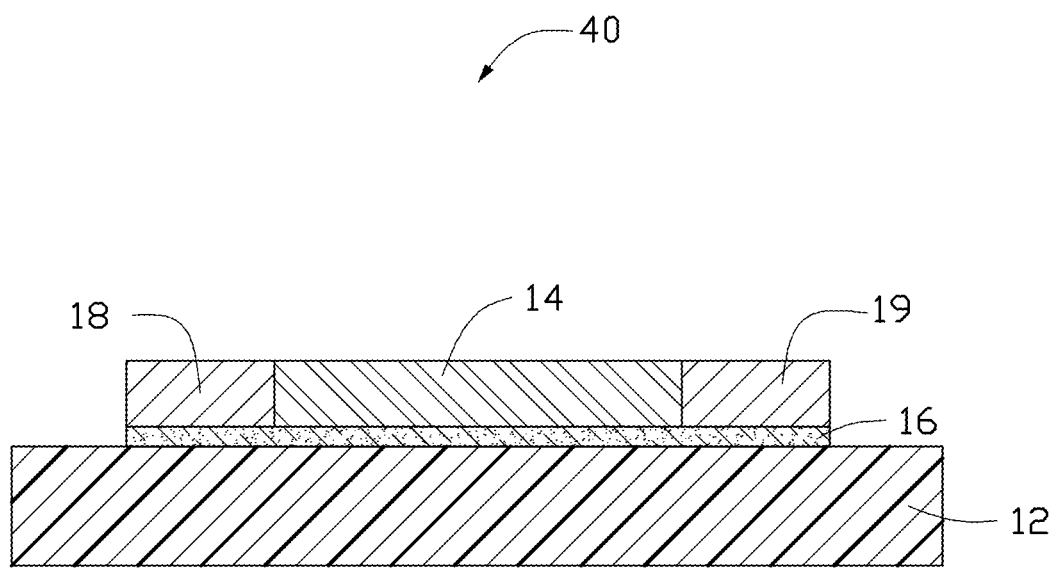
FIG. 9 is a schematic view of one embodiment of a thermochromatic element.

Referring to FIG. 9, a thermochromatic element 40 of one embodiment includes an insulating substrate 12, a color element 14, a heating element 16, a first electrode 18, and a second electrode 19. The thermochromatic element 40 is similar to the thermochromatic element 10 described above except that the heating element 16 is located between the insulating substrate 12 and the color element 14 and extends to a profile of the color element 14. In one embodiment, the heating element 16 is located on a surface of the insulating substrate 12. The color element 14 is located on a surface of the heating element 16. The first electrode 18 and the second electrode 19 are separately located on the surface of the heating element 16 and two opposite sides of the color element 14.

Figure 10:
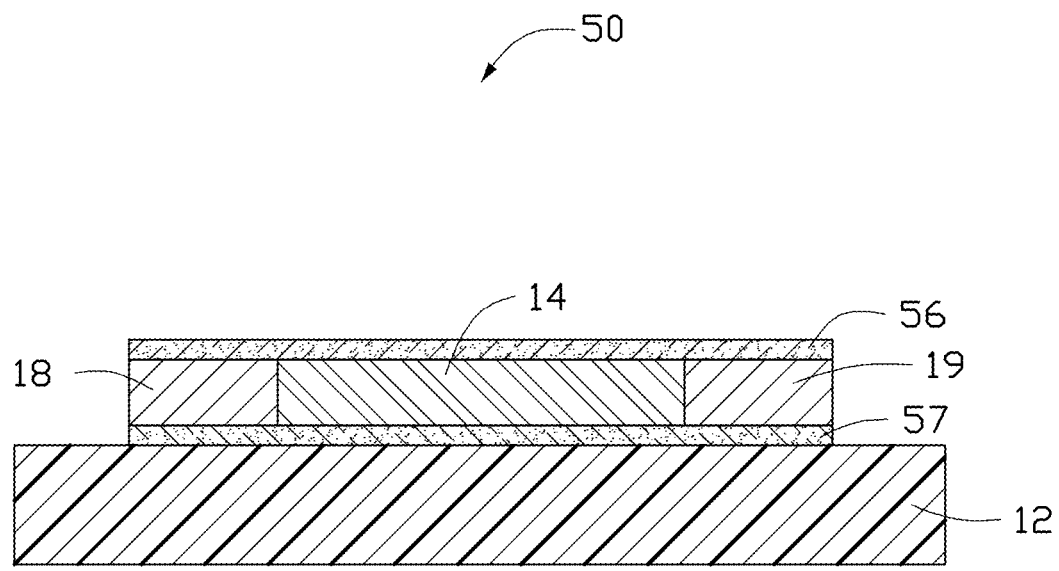
FIG. 10 is a schematic view of one embodiment of a thermochromatic element.

Referring to FIG. 10, a thermochromatic element 50 of one embodiment includes an insulating substrate 12, a color element 14, a first heating element 56, a second heating element 57, a first electrode 18 and a second electrode 19. The thermochromatic element 50 is similar to the thermochromatic element 10 described above except that the thermochromatic element 50 further includes the second heating element 57 located on a surface of the insulating substrate 12. In one embodiment, the insulating substrate 12, the second heating element 57, the color element 14, and the first heating element 56 are overlapped with each other in order. As such, the color element 14 is located between the first and second heating elements 56, 57. The second heating element 57 is located between the insulating substrate 12 and the color element 14. The first electrode 18 and the second electrode 19 are located between the first and second heating elements 56, 57 and spacedly located two opposite sides of the color element 14. The color element 14 is located on the surface of the second heating element 57 and between the first electrode 18 and the second electrode 19. The first heating element 56 is located on a surface of the color element 14 and covers the first electrode 18 and the second electrode 19. The first heating element 56 and the second heating element 57 are the carbon nanotube structure including at least one carbon nanotube film 162. In one embodiment, the heating elements 56 and 57 are single drawn carbon nanotube film, which is transparent and free standing. The first and second heating elements 56, 57 are simultaneously electrically connected with the first and second elements 18, 19. As such, the color element 14 can be heated effectively. The thermochromatic element 50 has an improved response speed.

Figure 11:
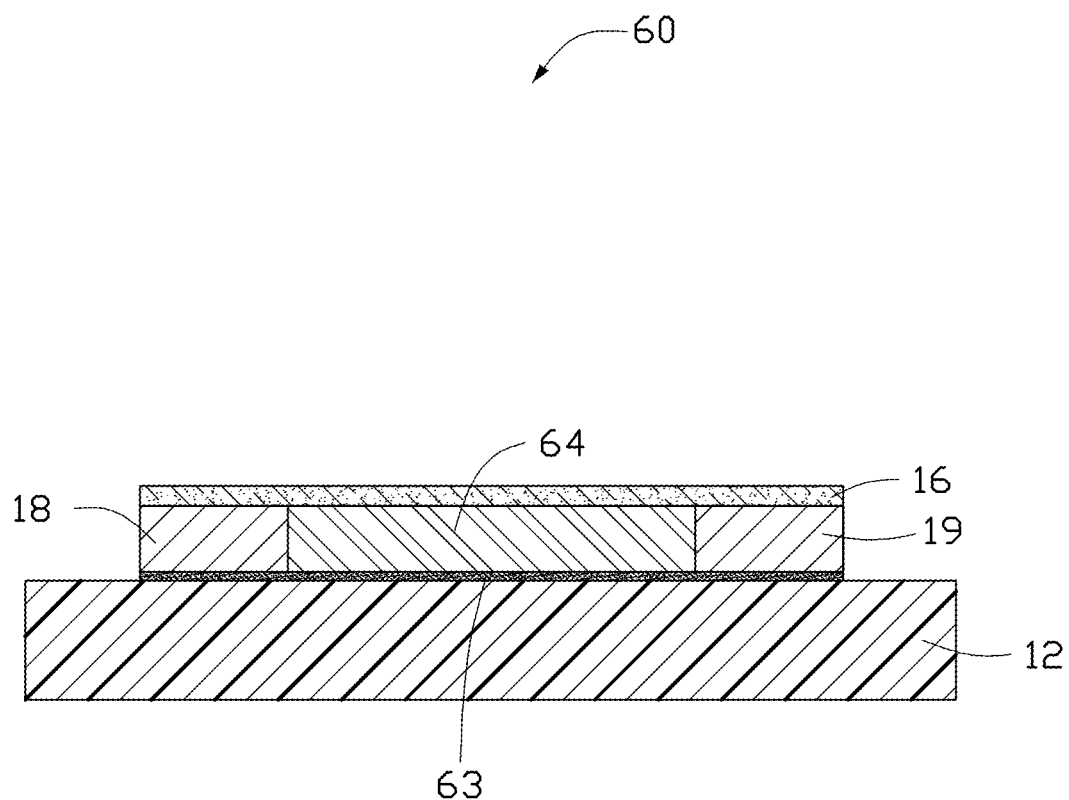
FIG. 11 is a schematic view of one embodiment of a thermochromatic element.

Referring to FIG. 11, a thermochromatic element 60 of one embodiment includes an insulating substrate 12, a back color layer 63, a color element 64, a heating element 16, a first electrode 18, and a second electrode 19. The thermochromatic element 60 is similar to the thermochromatic element 10 described above except that the thermochromatic element 60 further includes the back color layer 63 located between the insulating substrate 12 and the color element 64. In one embodiment, the back color layer 63 is overlapped with a surface of the insulating substrate 12. The color element 64 contacts with a surface of the back color layer 63.

The back color layer 63 can be a layer of any color material, such a white or black. The color of the back color layer 63 will not change with the temperature change at a temperature below 200° C. The thickness of the back color layer 63 is in a range from about 1 micrometer to about 100 micrometers. The back color layer 63 can be formed by printing, spraying, coating, or sputtering.

The color element 64 is made of transparence-changeable material which can perform a transformation between the transparent state and nontransparent state at a phase change temperature. When the color element 64 is transparent, the thermochromatic element 60 can show the color of the back color layer 63. When the color element 64 is nontransparent, the thermochromatic element 60 does not display any color.

The phase change temperature of the transparence-changeable material for the color element 64 is below 200° C. In one embodiment, the phase change temperature of the transparence-changeable material is in a range from about 40° C. to about 100° C. so that the thermochromatic element 60 can work at room temperature using a low working voltage. The material of the color element 64 can be a mixture of polymer and fatty acid, a mixture of at least two polymers which is phase-changeable between compatible state and incompatible state, or a polymer material which is phase-changeable between crystalline and amorphous. In one embodiment, the color element 64 is a layer of poly(1.4-thiophenol-1.4-divinylbenzene) with a thickness from about 10 micrometers to about 400 micrometers. In other embodiments, the thickness of the color element 64 is a layer of poly(1.4-thiophenol-1.4-divinylbenzene) ranges from about 50 micrometers to about 100 micrometers.

It can be understood that, any one of thermochromatic elements 10, 20, 30, 40 and 50 also can further include the back color layer 63 located on the surface of the insulating substrate 12, and the color element 64 replaces the color element 14.

Figure 12:
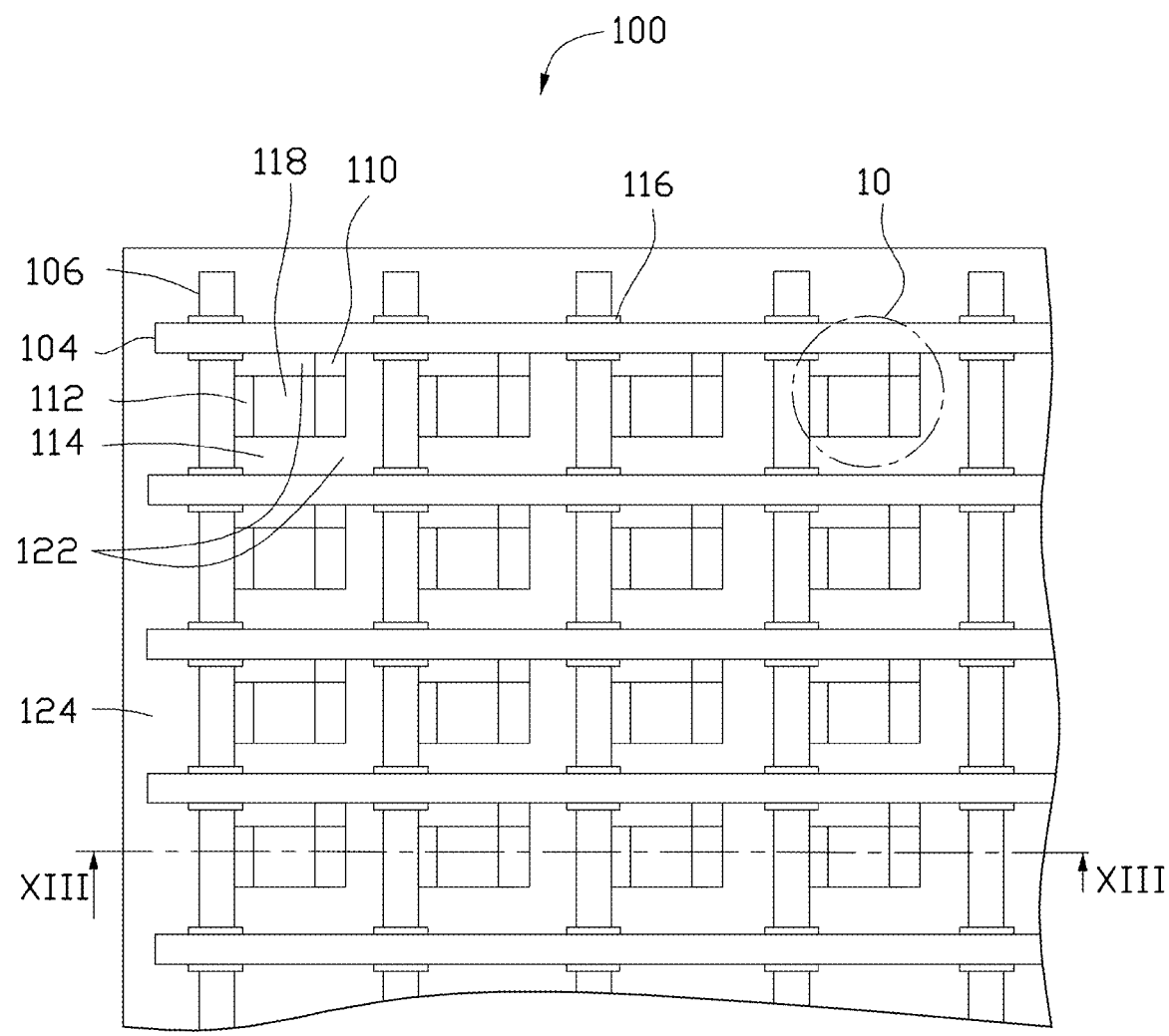
FIG. 12 is a schematic view of a thermochromatic display apparatus using the thermochromatic element of FIG. 1.
Figure 13:
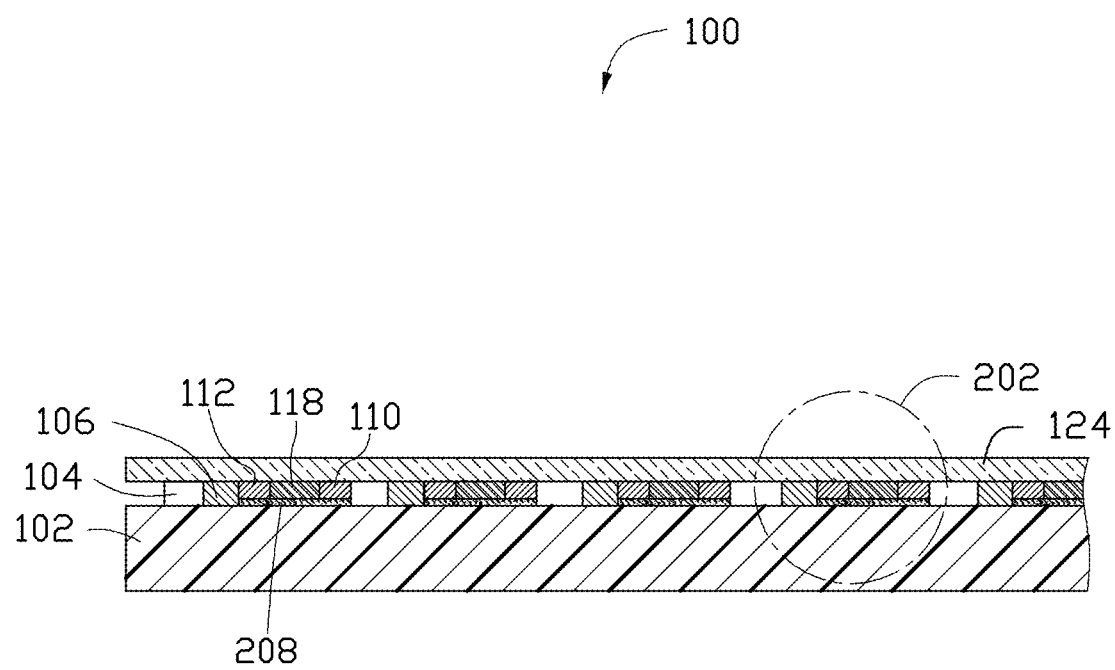
FIG. 13 is a schematic, cross-sectional view, along a line XIII-XIII of FIG. 12.

Referring to FIGS. 12 and 13, a thermochromatic display apparatus 100 includes an insulating substrate 12, a number of substantially parallel first electrode down-leads 104, a number of substantially parallel second electrode down-leads 106, and a number of thermochromatic elements 10. The number of first and second electrode down-leads 104 and 106 are located on the insulating substrate 12. The first electrode down-leads 104 are generally set at an angle to the second electrode down-leads 106 to form a grid. A cell 114 is defined by each two substantially adjacent first electrode down-leads 104 and each two substantially adjacent second electrode down-leads 106 of the grid. One of the thermochromatic elements 10 is located in each cell 114. Each thermochromatic element 10 corresponds to a pixel of the thermochromatic display apparatus 100.

The insulating substrate 12 is configured for supporting the first electrode down-leads 104, the second electrode down-leads 106, and the thermochromatic elements 10. The shape, size, and thickness of the insulating substrate 12 can be chosen according to need. In one embodiment, the insulating substrate 12 is a square PET substrate with a thickness of 1 millimeter and an edge length of 48 millimeters. The number of thermochromatic elements 10 uses a common insulating substrate 12, therefore there is no need an additional insulating substrate for each thermochromatic element 10.

The first electrode down-leads 104 are located equidistantly apart. A distance between adjacent two first electrode down-leads 104 can range from about 50 micrometers to about 2 centimeters. The second electrode down-leads 106 are located equidistantly apart. A distance between adjacent two second electrode down-leads 106 can range from about 50 micrometers to about 2 centimeters. A suitable orientation of the first electrode down-leads 104 and the second electrode down-leads 106 are that they be set at an angle with respect to each other. The angle can range from about 10 degrees to about 90 degrees. In one embodiment, the angle is 90 degrees, and the cell 114 is a square area.

The first electrode down-leads 104 and the second electrode down-leads 106 are made of conductive material such as metal or conductive slurry. In one embodiment, the first electrode down-leads 104 and the second electrode down-leads 106 are formed by applying conductive slurry on the insulating substrate 12 using screen printing process. The conductive slurry composed of metal powder, glass powder, and binder. The metal powder can be silver powder, the glass powder having low melting point, and the binder can be terpineol or ethyl cellulose (EC). The conductive slurry can include about 50% to about 90% (by weight) of the metal powder, about 2% to about 10% (by weight) of the glass powder, and about 8% to about 40% (by weight) of the binder. In one embodiment, each of the first electrode down-leads 104 and the second electrode down-leads 106 is formed with a width in a range from about 30 micrometers to about 100 micrometers and with a thickness in a range from about 10 micrometers to about 50 micrometers. However, it is noted that dimensions of each of the first electrode down-leads 104 and the second electrode down-leads 106 can vary corresponding to dimension of each cell 114.

The first electrodes 18 of the thermochromatic elements 10 arranged in a row of the cells 114 can be electrically connected to the first electrode down-lead 104. The second electrodes 19 of the thermochromatic elements 10 arranged in a column of the cells 114 can be electrically connected to the second electrode down-lead 106.

Each of the first electrodes 18 can have a length in a range from about 20 micrometers to about 15 millimeters, a width in a range from about 30 micrometers to 10 millimeters and a thickness in a range from about 10 micrometers to about 500 micrometers. Each of the second electrodes 19 has a length in a range from about 20 micrometers to about 15 millimeters, a width in a range from about 30 micrometers to about 10 millimeters and a thickness in a range from about 10 micrometers to about 500 micrometers. In one embodiment, the first electrode 18 has a length in a range from about 100 micrometers to about 700 micrometers, a width in a range from about 50 micrometers to about 500 micrometers and a thickness in a range from about 20 micrometers to about 100 micrometers. The second electrode 19 has a length in a range from about 100 micrometers to about 700 micrometers, a width in a range from about 50 micrometers to about 500 micrometers and a thickness in a range from about 20 micrometers to about 100 micrometers.

The first electrodes 18 and the second electrodes 19 can be made of metal or conductive slurry. In one embodiment, the first electrode 18 and the second electrode 19 are formed by screen printing the conductive slurry on the insulating substrate 12. As mentioned above, the conductive slurry forming the first electrode 18 and the second electrode 19 is the same as the electrode down-leads 104, 106.

Furthermore, the thermochromatic display apparatus 100 can include a plurality of insulators 116 sandwiched between the first electrode down-leads 104 and the second electrode down-leads 106 to avoid short-circuiting. The insulators 116 are located at every intersection of the first electrode down-leads 104 and the second electrode down-leads 106 for providing electrical insulation therebetween. In one embodiment, the insulator 116 is a dielectric insulator.

In one embodiment, 16×16 (16 rows, and 16 thermochromatic elements 10 on each row) thermochromatic elements 10 are arranged on a square PET insulating substrate 12 with an edge length of 48 millimeters. Each heating element 16 is a single carbon nanotube film with a length of 300 micrometers and a width of 100 micrometers. The single carbon nanotube film is fixed on the surface of the insulating substrate 12 with an adhesive. The ends of the heating element 16 are located between the insulating substrate 12 and the first and second electrodes 18, 19. The carbon nanotube linear structures of the heating element 16 extend from the first electrode 18 to the second electrode 19.

Furthermore, the thermochromatic display apparatus 100 can include a heat-resistant material 122 located around each thermochromatic element 10. The heat-resistant material 122 can be located in a space between the thermochromatic element 10 and the electrode down-leads 104, 106 in the cell 114. The thermochromatic elements 10 in adjacent cells 114 are heat insulated and will not interfere with each other. The heat-resistant material 122 can be aluminum oxide ($Al_2O_3$) or organic material such as PET, PC, PE, or PI. In one embodiment, the heat-resistant material 122 is PET with a thickness same as the thickness of the electrode down-leads 104, 106. The heat-resistant material 122 can be formed by printing, chemical vapor deposition or physical vapor deposition.

Furthermore, the thermochromatic display apparatus 100 can include a protecting layer 124 located on the insulating substrate 12 to cover all the electrode down-leads 104, 106, and the thermochromatic elements 10. The protecting layer 124 is an insulating transparent layer that can be made of $Al_2O_3$, silicon dioxide ($SiO_2$), or organic material such as PET, PC, PE, or PI. The thickness of the protecting layer 124 can be selected according to need. In one embodiment, the protecting layer 124 is a PET sheet with a thickness in a range from about 0.5 millimeter to about 2 millimeters. The protecting layer 124 can prevent the thermochromatic display apparatus 100 from being damaged and polluted.

In use, the thermochromatic display apparatus 100 can include a driving circuit (not shown) to drive the thermochromatic display apparatus 100 to display. The driving circuit can control the thermochromatic elements 10 through the electrode down-leads 104 and 106 to display a dynamic image.

The thermochromatic display apparatus 100 can be used in a field of advertisement billboard, newspaper, or electronic book.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A thermochromatic element, comprising: a color element and at least one heating element configured to supply heat for the color element such that the color element changes color, the at least one heating element comprising at least one carbon nanotube film comprising:
   a plurality of carbon nanotube linear units spaced from each other and substantially extending along a first direction, and each of the plurality of carbon nanotube linear units comprising a plurality of first carbon nanotubes that are substantially oriented along the first direction; and
   a plurality of carbon nanotube groups combined with the plurality of carbon nanotube linear units by van der Waals force, and wherein the plurality of carbon nanotube groups between adjacent two of the plurality of carbon nanotube linear units are spaced from each other in the first direction.

2. The thermochromatic element of claim 1, wherein the plurality of carbon nanotube linear units are substantially parallel to each other and form a plurality of first conductive paths along the first direction.

3. The thermochromatic element of claim 1, wherein the plurality of carbon nanotube groups are interlacedly arranged along a second direction, that intersects with the first direction.

4. The thermochromatic element of claim 1, wherein the plurality of carbon nanotube groups are arranged to form a plurality of columns.

5. The thermochromatic element of claim 1, wherein each carbon nanotube linear unit comprises a plurality of first carbon nanotubes joined end-to-end by van der Waals force along the first direction.

6. The thermochromatic element of claim 1, wherein each carbon nanotube group comprises a plurality of second carbon nanotubes substantially extending along the first direction.

7. The thermochromatic element of claim 1, wherein each carbon nanotube group comprises a plurality of second carbon nanotubes intercrossed with each other to form a net structure.

8. The thermochromatic element of claim 1, wherein the plurality of carbon nanotube groups are alternated with the plurality of carbon nanotube linear units along a second direction, that intersects with the first direction.

9. The thermochromatic element of claim 1, wherein each of the at least one carbon nanotube film comprises a plurality of carbon nanotubes arranged to form the plurality of carbon nanotube linear units and the plurality of carbon nanotube groups, and being defined a plurality of apertures.

10. The thermochromatic element of claim 9, wherein a surface area ratio between the plurality of carbon nanotubes and the plurality of apertures is less than or equal to 1:19.

11. The thermochromatic element of claim 10, wherein the surface area ratio between the plurality of carbon nanotubes and the plurality of apertures is less than or equal to 1:49.

12. The thermochromatic element of claim 1, wherein the color element and the at least one heating element are stacked on each other.

13. The thermochromatic element of claim 12, wherein the at least one heating element comprises two heating elements located on two opposite surfaces of the color element.

14. The thermochromatic element of claim 1, wherein the color element is spaced from the heating element through a supporter.

15. The thermochromatic element of claim 1, further comprising an insulating substrate defining a recess; wherein the color element is located in the recess, and the at least one heating element covers the color element.

16. A thermochromatic element, comprising:
an insulating substrate having a surface;
a back color layer located on the surface of the insulating substrate;
a color element overlapped with the back color layer; and
at least one heating element configured to supply heat for the color element, the at least one heating element comprising at least one carbon nanotube film comprising:
a plurality of carbon nanotube linear units comprising a plurality of first carbon nanotubes substantially oriented along a first direction, the plurality of carbon nanotube linear units spaced from each other and substantially extending along the first direction; and
a plurality of carbon nanotube groups combined with the plurality of carbon nanotube linear units by van der Waals force, wherein the plurality of carbon nanotube groups between adjacent carbon nanotube linear units are spaced from each other in the first direction.

17. The thermochromatic element of claim 16, wherein the at least one carbon nanotube film defines a plurality of apertures arranged orderly.

18. A thermochromatic display apparatus, comprising:
an insulating substrate;
a plurality of first electrode down-leads located on the insulating substrate, wherein the plurality of first electrode down-leads are substantially parallel with each other;
a plurality of second electrode down-leads located on the insulating substrate, wherein the plurality of second electrode down-leads are substantially parallel with each other, and the plurality of first electrode down-leads are crossed with the plurality of second electrode down-leads to form a grid structure, and each two adjacent first electrode down-leads and each two adjacent second electrode down-leads of the grid structure define a cell; and
a plurality of thermochromatic elements, wherein each of the plurality of thermochromatic elements is located in the cell, and each of the plurality of thermochromatic elements comprises:
a color element and at least one heating element configured to supply heat for the color element such that the color element changes color, the at least one heating element comprising at least one carbon nanotube film comprising:
a plurality of carbon nanotube linear units comprising a plurality of first carbon nanotubes substantially oriented along a first direction, the plurality of carbon nanotube linear units spaced from each other and substantially extending along the first direction; and
a plurality of carbon nanotube groups combined with the plurality of carbon nanotube linear units by van der Waals force, wherein the plurality of carbon nanotube groups between adjacent carbon nanotube linear units are spaced from each other in the first direction.

19. The thermochromatic display apparatus of claim 18, further comprising a heat-resistant material located around each of the plurality of thermochromatic elements.

20. The thermochromatic display apparatus of claim 18, further comprising a protecting layer located on the insulating substrate to cover the plurality of first electrode down-leads, the plurality of second electrode down-leads and the plurality of thermochromatic elements.

\* \* \* \* \*